US010050746B2

(12) United States Patent
Rong et al.

(10) Patent No.: US 10,050,746 B2
(45) Date of Patent: Aug. 14, 2018

(54) SYSTEM AND METHOD FOR ORTHOGONAL FREQUENCY DIVISION MULTIPLE ACCESS POWER-SAVING POLL TRANSMISSION

(71) Applicant: Futurewei Technologies, Inc., Plano, TX (US)

(72) Inventors: Zhigang Rong, San Diego, CA (US); Yunsong Yang, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 230 days.

(21) Appl. No.: 14/959,856

(22) Filed: Dec. 4, 2015

(65) Prior Publication Data

US 2016/0173377 A1    Jun. 16, 2016

Related U.S. Application Data

(60) Provisional application No. 62/092,673, filed on Dec. 16, 2014.

(51) Int. Cl.
*H04L 12/741* (2013.01)
*H04L 1/16* (2006.01)
*H04L 12/26* (2006.01)
*H04L 5/00* (2006.01)
*H04W 74/04* (2009.01)

(52) U.S. Cl.
CPC .......... *H04L 1/1614* (2013.01); *H04W 74/04* (2013.01); *H04L 1/1685* (2013.01); *H04L 5/0007* (2013.01); *H04L 5/0094* (2013.01); *Y02D 70/00* (2018.01); *Y02D 70/1262* (2018.01); *Y02D 70/142* (2018.01); *Y02D 70/144* (2018.01); *Y02D 70/166* (2018.01); *Y02D 70/26* (2018.01)

(58) Field of Classification Search
CPC .... H04W 74/04; H04L 1/1614; H04L 5/0094; H04L 5/0007
See application file for complete search history.

(56) References Cited

U.S. PATENT DOCUMENTS

2005/0288070 A1    12/2005    Omori et al.
2009/0154418 A1*   6/2009    Kang .................. H04W 72/042
                                                        370/329

(Continued)

FOREIGN PATENT DOCUMENTS

CN          1716895 A      1/2006
CN        104115542 A    10/2014

OTHER PUBLICATIONS

Cariou, L. et al., "High-efficiency WLAN," IEEE 802.11-13/0331r5, Mar. 19, 2013, 21 pages.

(Continued)

*Primary Examiner* — Gbemileke J Onamuti
(74) *Attorney, Agent, or Firm* — Slater Matsil, LLP

(57) ABSTRACT

A method for communicating in a wireless communications system includes receiving a first frame including a paging bitmap and a timing offset indicator, determining whether the station is permitted to transmit a packet according to the paging bitmap, and when the station is permitted to transmit the packet, determine a location of a network resource in accordance with a station identifier and the timing offset indicator, and transmitting, by the station, the packet in accordance with the location of the network resource.

25 Claims, 12 Drawing Sheets

(56) References Cited

U.S. PATENT DOCUMENTS

| | | |
|---|---|---|
| 2013/0294360 A1 | 11/2013 | Yang et al. |
| 2015/0009879 A1 | 1/2015 | Kim et al. |
| 2015/0078352 A1 | 3/2015 | Rong et al. |
| 2016/0057779 A1* | 2/2016 | Kim .................... H04W 74/006 370/338 |
| 2017/0273019 A1* | 9/2017 | Park .................. H04W 52/0209 |

OTHER PUBLICATIONS

Cariou, L., et al., "High-efficiency WLAN Straw poll," IEEE 802.11-143/0339r10, Mar. 19, 2013, 7 pages.

* cited by examiner

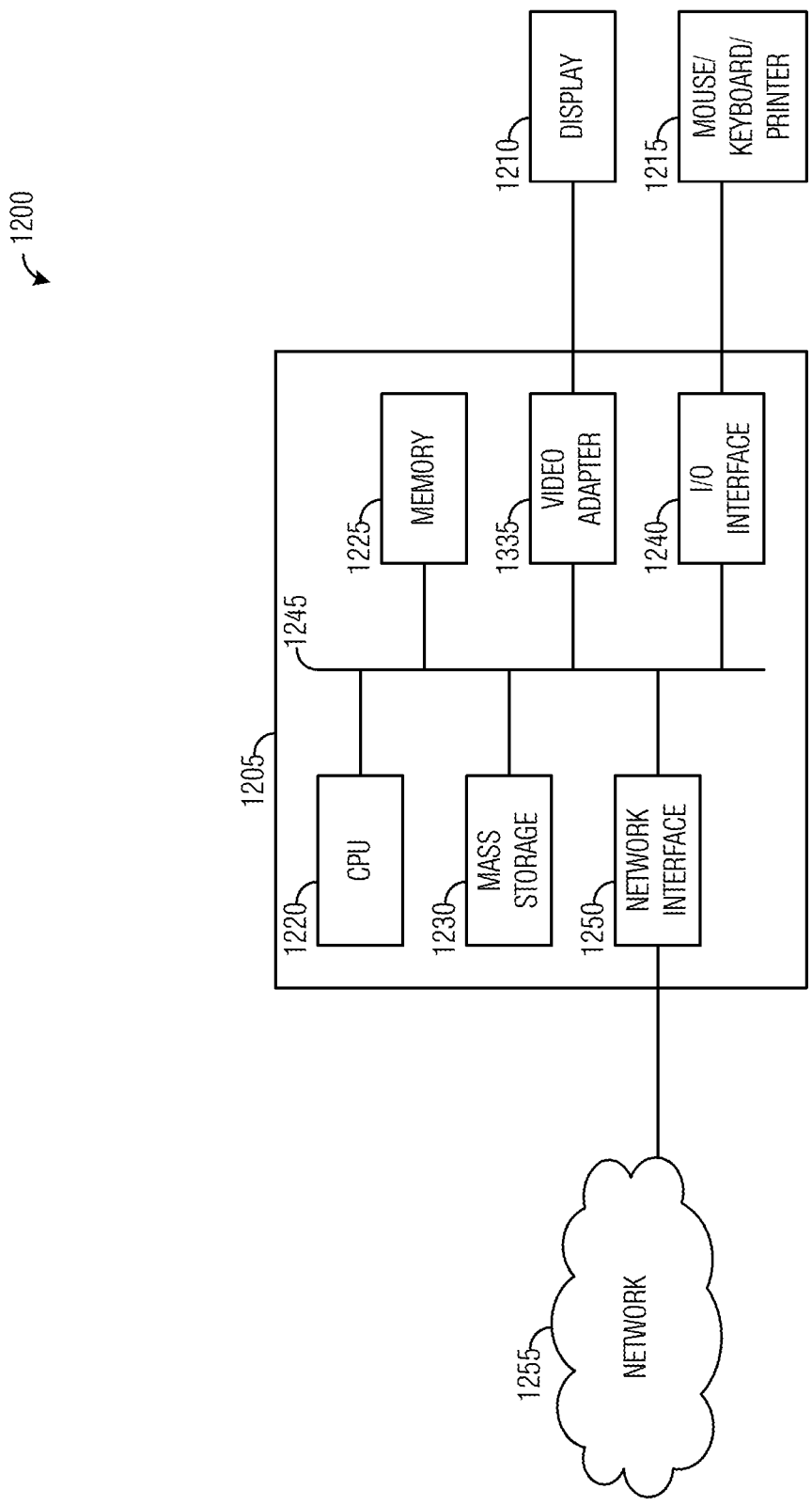

SYSTEM AND METHOD FOR ORTHOGONAL FREQUENCY DIVISION MULTIPLE ACCESS POWER-SAVING POLL TRANSMISSION

This application claims the benefit of U.S. Provisional Application No. 62/092,673, filed on Dec. 16, 2014, entitled "System and Method for OFDMA PS-Poll Transmission," which application is hereby incorporated herein by reference.

TECHNICAL FIELD

The present disclosure relates generally to digital communication, and more particularly to a system and method for orthogonal frequency division multiple access (OFDMA) power-saving poll (PS-Poll) transmission.

BACKGROUND

The number of devices using Wireless Local Area Networks (WLAN) continues to show dramatic growth. WLANs allow users the ability to connect to high-speed services without being tethered to wireline connections. WLANs are wireless communications systems that are based on the IEEE 802.11 series of technical standards. Typically, as the number of devices using WLANs increases, the density of devices in the WLANs (e.g., access points (APs) and stations (STA)) will also increase. High densities of APs (also commonly referred to as communications controller, controller, and the like) and stations (also commonly referred to as user, subscriber, terminal, and the like) tend to make WLANs less efficient, especially since the original WLANs were designed assuming a low density of APs and stations. As an example of inefficiency, a currently used enhanced distributed channel access (EDCA) based media access control (MAC) scheme generally does not work efficiently in an environment with high AP and station density.

SUMMARY OF THE DISCLOSURE

Example embodiments provide a system and method for orthogonal frequency division multiple access (OFDMA) power-saving poll (PS-Poll) transmission.

In accordance with an example embodiment, a method for communicating in a wireless communications system is provided. The method includes receiving, by a station, a first frame including a paging bitmap and a timing offset indicator, determining, by the station, whether the station is permitted to transmit a packet according to the paging bitmap, and when the station is permitted to transmit the packet, determining, by the station, a location of a network resource in accordance with a station identifier and the timing offset indicator, and transmitting, by the station, the packet in accordance with the location of the network resource.

In accordance with another example embodiment, a method for communicating in a wireless communications system is provided. The method includes transmitting, by an access point (AP), a first frame including a paging bitmap and a timing offset indicator, determining, by the AP, a plurality of candidate transmitting stations in accordance with the paging bitmap, determining, by the AP, a plurality of network resource locations in accordance with identifiers of stations in the plurality of candidate transmitting stations, and receiving, by the AP, at least one packet in the plurality of network resource locations.

In accordance with another example embodiment, a station adapted for communications is provided. The station includes a processor, and a computer readable storage medium storing programming for execution by the processor. The programming including instructions to configure the station to receive a first frame including a paging bitmap and a timing offset indicator, determine whether the station is permitted to transmit a packet according to the paging bitmap, and when the station is permitted to transmit the packet, determine a location of a network resource in accordance with a station identifier and the timing offset indicator, and transmitting, by the station, the packet in accordance with the location of the network resource.

Practice of the foregoing embodiments enable the use of OFDMA in the transmission of short packets, thereby allowing multiple stations to share valuable network resources and increase resource utilization.

BRIEF DESCRIPTION OF THE DRAWINGS

For a more complete understanding of the present disclosure, and the advantages thereof, reference is now made to the following descriptions taken in conjunction with the accompanying drawing, in which:

FIG. 12 is a block diagram of a processing system that may be used for implementing the devices and methods disclosed herein.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to a system and method for orthogonal frequency division multiple access (OFDMA) power-saving poll (PS-Poll) transmission. For example, a station receives a first frame including a paging bitmap and a timing offset indicator, determines whether the station is permitted to transmit a packet according to the paging bitmap, and when the station is permitted to transmit the packet, the station determines a location of a network resource in accordance with a station identifier and the timing offset indicator, and transmits the packet in accordance with the location of the network resource.

The embodiments will be described with respect to example embodiments in a specific context, namely communications systems that use paging bitmaps and short packet transmission to help improve communications efficiency in high density environments. The embodiments may be applied to standards compliant communications systems, such as those that are compliant with Third Generation Partnership Project (3GPP), IEEE 802.11, and the like, technical standards, and non-standards compliant communications systems, that use paging bitmaps and short packet transmission to help communications efficiency in high density environments.

Figure 1:
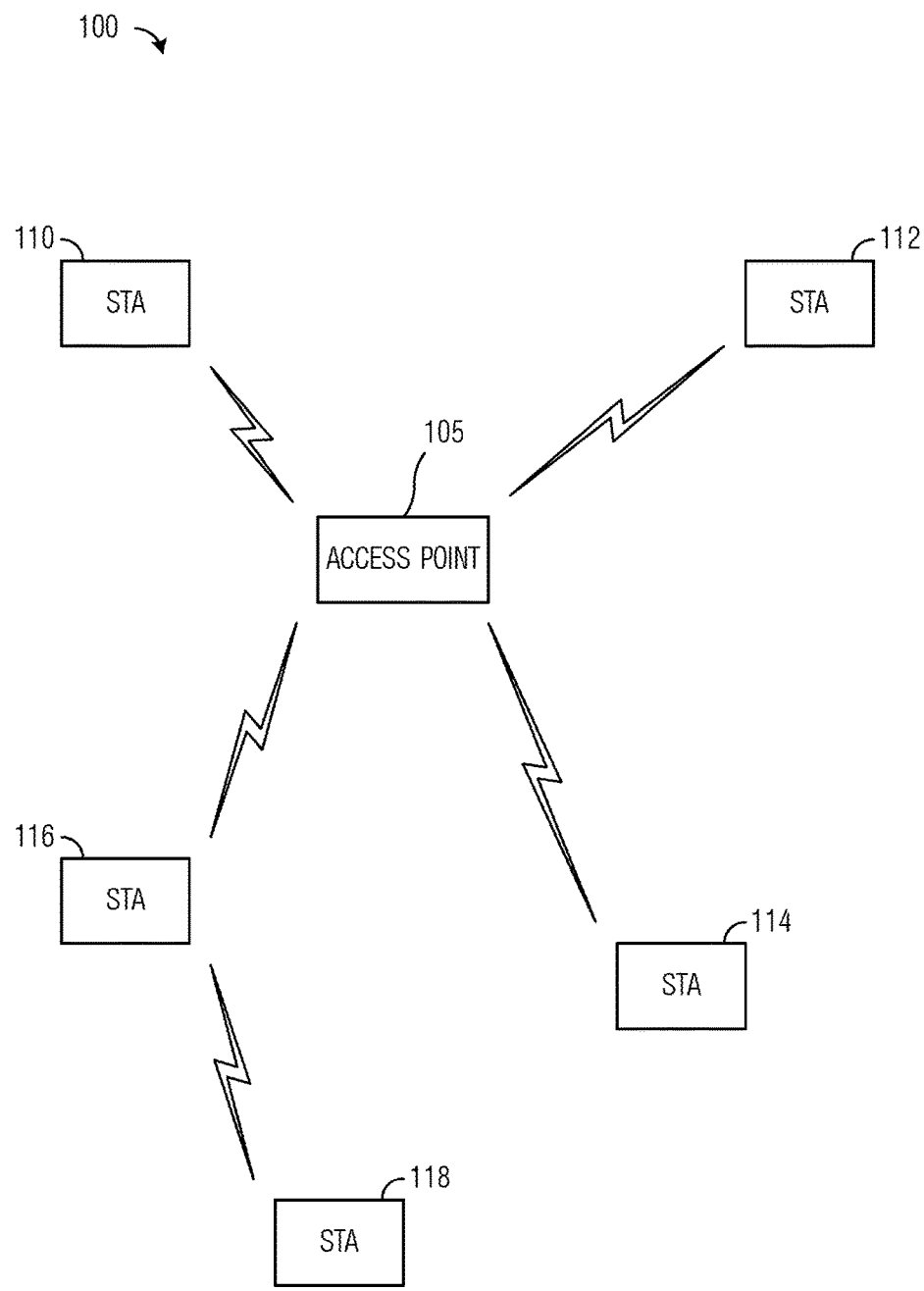
FIG. 1 illustrates an example wireless communications system according to example embodiments described herein.

FIG. 1 illustrates an example wireless communications system 100. Wireless communications system 100 includes an access point (AP) 105 that serves one or more stations, such as stations (STA) 110, 112, 114, and 116, by receiving communications originating from the stations and then forwarding the communications to their intended destinations or receiving communications destined to the stations and then forwarding the communications to their intended stations. In addition to communicating through AP 105, some stations may directly communicate with one another. As an illustrative example, station 116 may transmit directly to station 118.

While it is understood that communications systems may employ multiple APs capable of communicating with a number of stations, only one AP, and a number of stations are illustrated for simplicity.

Transmissions to and/or from a station occur on a shared wireless channel. WLANs make use of carrier sense multiple access with collision avoidance (CSMA/CA), where a station desiring to transmit needs to contend for access to the wireless channel before it can transmit. A station may contend for access to the wireless channel using a network allocation vector (NAV). The NAV may be set to a first value to represent that the wireless channel is busy and to a second value to represent that the wireless channel is idle. The NAV may be set by station in accordance with physical carrier sensing and/or reception of transmissions from other stations and/or APs. Therefore, contending for access to the wireless channel may require the station to expend a significant amount of time, thereby decreasing wireless channel utilization and overall efficiency. Furthermore, contending for access to the wireless channel may become difficult if not impossible as the number of stations contending for access increases.

Figure 2:
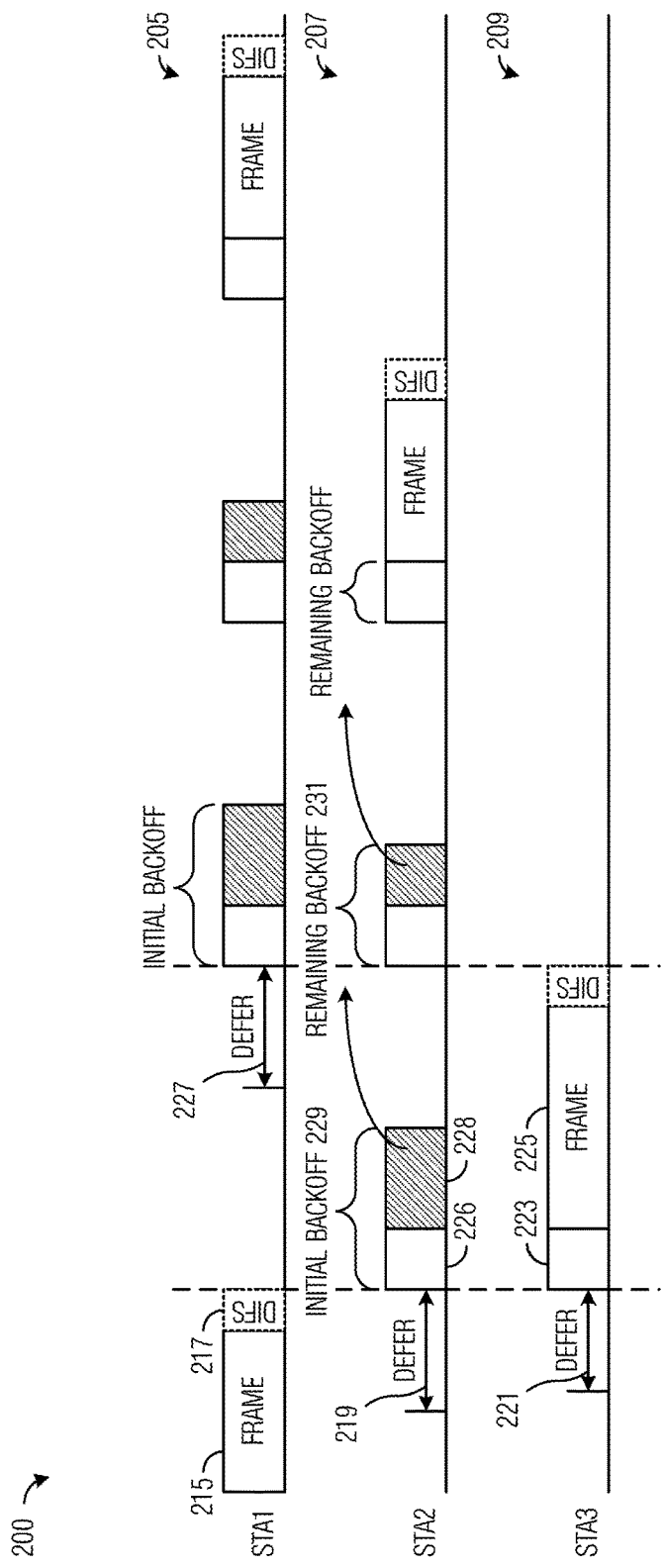
FIG. 2 illustrates a diagram of example channel access timing according to example embodiments described herein.

FIG. 2 illustrates a diagram 200 of example channel access timing. A first trace 205 represents channel access for a first station (STA1), a second trace 207 represents channel access for a second station (STA2), and a third trace 209 represents channel access for a third station (STA3). A short inter-frame space (SIFS) has a duration of 16 microseconds, a point coordination function (PCF) inter-frame space (PIFS) has a duration of 25 microseconds, while a distributed inter-frame space (DIFS) may last longer than either the SIFS or the PIFS. A backoff period may be a random duration. Therefore, active scanning may not provide the best solution when there are large numbers of stations attempting to perform AP/network discovery.

As shown in FIG. 2, STA1 is able to obtain access to the wireless channel and is able to transmit frame 217. While STA1 is transmitting frame 215, both STA2 and STA3 attempt to obtain access to the wireless channel, but since the wireless channel is busy, both defer (defer period 219 and defer period 221). Both STA2 and STA3 defer until one DIFS period 217 after the end of frame 215. Then STA2 and STA3 begin to contend for access to the wireless channel, by randomly selecting a backoff period to wait. After the random backoff period of a station expires, the station is permitted to contend for access to the wireless channel. As shown in FIG. 2, the random backoff period of STA3 is shorter (shown as period 223) than that of STA2, STA3 is able to obtain access to the wireless channel and transmits frame 225. During the random backoff period of STA2 (initial backoff 229), STA2 detects that the wireless channel becomes busy so STA2 stops counting down the random backoff period. The time interval between the start of the random backoff period of STA2 until when STA2 stops counting down (interval 226) plus the remaining backoff (interval 228) is referred to as an initial backoff 229. Similarly, while STA3 is transmitting, STA1 detects that the wireless channel is busy and defers (defer period 227) until one DIFS period after the end of frame 225. One DIFS period after the end of frame 225, both STA1 and STA2 begin their backoff, with STA2 continuing its previously stopped random backoff period and STA1 randomly selecting a backoff period to wait. The time interval between when STA2 resumes the countdown of the random backoff period and the end of the random backoff period is referred to as a remaining backoff 231. When remaining backoff 231 expires, STA2 is able to obtain access to the wireless channel and transmits a frame.

In cellular communications systems, e.g., Third Generation Partnership Project (3GPP) Long Term Evolution (LTE) compliant communications systems, OFDMA has been shown to be able to provide robust performance in high density environments. OFDMA has the ability to support multiple users simultaneously by carrying traffic from different users on different portions of the bandwidth of the communications system. In general, OFDMA can support a large number of users more efficiently, especially when data traffic from individual users is low. Specifically, OFDMA can avoid wasting frequency resources if traffic from one user cannot fill the entirety of the communications system bandwidth by utilizing the unused bandwidth to carry transmissions from other user(s). The ability to utilize unused bandwidth may become crucial as the communications system bandwidth continues to become wider.

Similarly, uplink multiuser multiple input multiple output (UL MU-MIMO) has also been used in cellular communications systems (e.g., 3GPP LTE) to enhance communications system performance. UL MU-MIMO allows multiple users to transmit simultaneously on the same network resource (e.g., a time-frequency resource) with the transmissions being separated in space, e.g., on different spatial streams.

In IEEE 802.11, an Access Point (AP) periodically transmits a Beacon frame. Beacon frames may also be referred to as trigger frames. Other types of trigger frames may include a stand-alone downlink frame comprising control information such as the uplink scheduling information, or a downlink frame where the control information such as the uplink scheduling information is sent together with other downlink data. The trigger frame can be in the form of a media access control (MAC) frame. The trigger frame can also be in the form of a null data packet (NDP) frame. The Beacon frame typically includes the access parameters of the basic service set (BSS) and a traffic indication map (TIM) information element (IE) that includes an indication of which station(s), out of a plurality of stations being served by the AP, the AP has buffered data. The TIM IE may also be referred as the TIM message or simply the TIM. The TIM may be used as part of a technique to help stations save power.

The process of indicating that the AP has buffered data for a station that is in a power-saving mode and wakes up intermittently at pre-subscribed time incidents in order to monitor such an indication is commonly referred to as a paging process. As an example, the TIM may include a bitmap with each station of the plurality of stations represented as a bit and the value of a particular bit indicating whether the AP has buffered data for the station represented by the particular bit. Each bit of the bitmaps may be referred to as a transmission indicator. If a station, after receiving the TIM, determines that the AP has buffered data for it (i.e., the bit in the TIM that is associated with the station is set of a specified value, e.g., 1), the station may transmit a PS-poll to the AP to indicate to the AP that the station is awake and is ready to receive at least some of the buffered data.

After receiving the PS-poll(s), the AP directly sends a downlink (DL) data frame to the station(s) or an acknowledgement frame(s) (or simply acknowledgement(s)) if it is not ready to transmit the downlink data. After sending the acknowledgement(s), the AP will send the downlink data soon. Although the discussion presented herein focuses on the terms TIM, TIM map, and TIM bitmap, the example embodiments presented herein are operable with other forms of paging information. In general, such other forms of paging information may be referred to as paging information, paging map, paging bitmap, and the like. A paging bitmap may include a plurality of bits corresponding to stations being potentially paged, with the value of the bits indicating if the station associated with the bits are being paged or not. A TIM bitmap may be an example of a paging bitmap.

Figure 3:
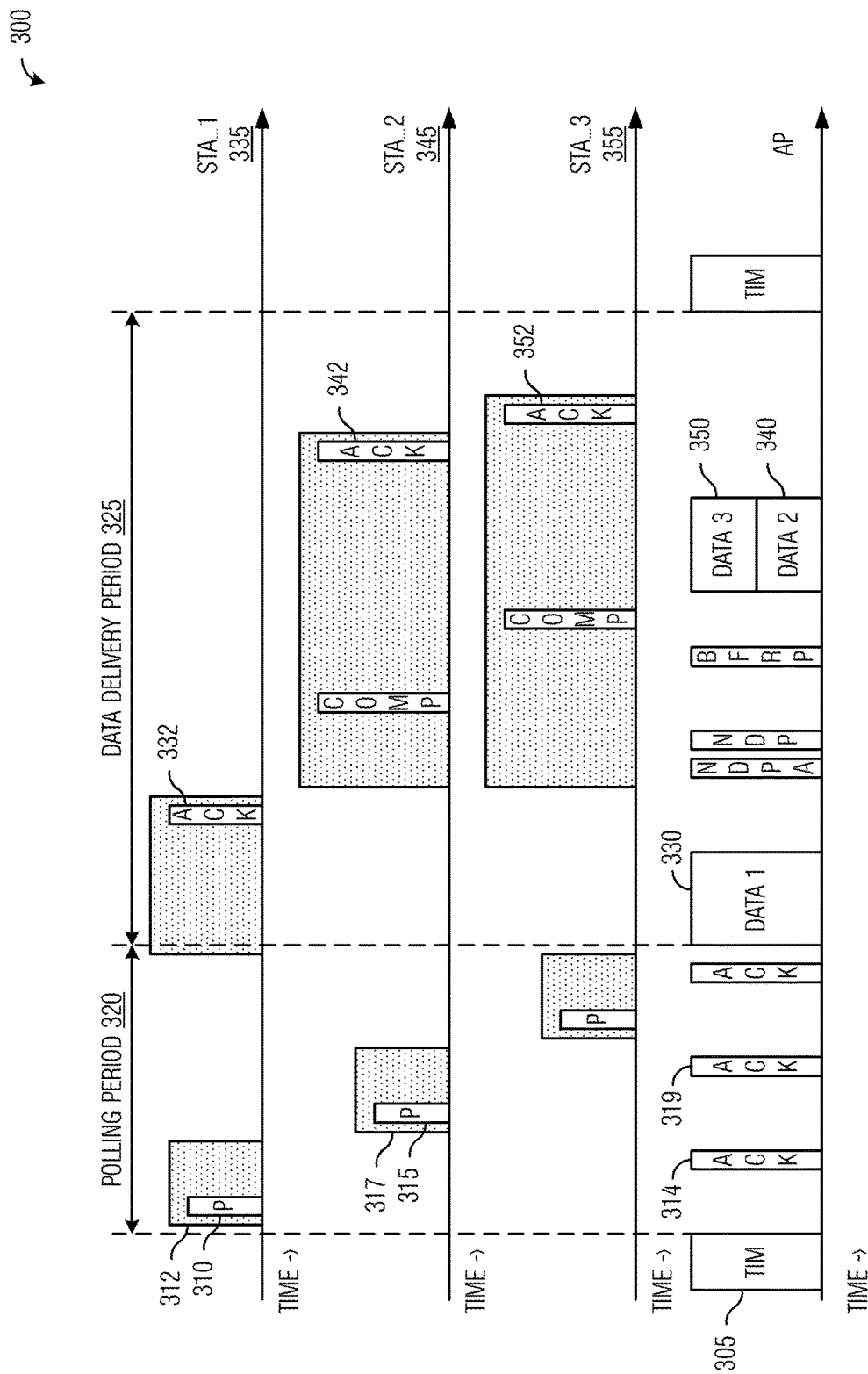
FIG. 3 illustrates a transmission diagram of example transmissions between an AP and a plurality of stations as the AP transmits downlink data to a subset of the plurality of stations according to example embodiments described herein.

FIG. 3 illustrates a transmission diagram 300 of example transmissions between an AP and a plurality of stations as the AP transmits downlink data to a subset of the plurality of stations. Transmission diagram 300 illustrates transmissions between the AP and the plurality of stations as discussed previously. At a first time, the AP transmits a Beacon frame that contains a TIM 305. TIM 305 includes an indication of stations for which there is buffered data at the AP. In other words, TIM 305 includes an indication indicating which stations the AP has buffered data for. As stations receive and decode TIM 305, those that are indicated as stations that the AP has buffered data for may transmit PS-polls, such as PS-poll 310 and PS-poll 315, during a polling period 320. Also shown in FIG. 3, are listening regions (shown as dotted regions, such as listening region 312 and listening region 317) when a corresponding station is listening for a transmission(s) intended for it.

When the AP receives the PS-polls, the AP may acknowledge receipt of the PS-polls by transmitting an acknowledgement for each PS-poll received. As an example, the AP may transmit acknowledgement 314 for PS-poll 310 and acknowledgement 319 for PS-poll 315. Each acknowledgement that the AP transmits may further include timing information (e.g., a beginning time and/or a length) of the downlink data that the AP will transmit to the station, based upon which the station may decide to enter a power-saving mode of operation after receiving the acknowledgement until a time at the beginning of the downlink data intended for the station. However, in this way, the AP may have to decide on the data timing for a particular station without knowing all the stations that will transmit their respective PS-polls since some of the stations may not have transmitted their PS-polls by the time the AP has to decide on the data timing. As a result, the decision on the data timing is not generally based on the full intelligence of all the stations that will transmit the PS-polls, thus may not be the most efficient or fair decision. Once the polling period is over, the AP may begin transmitting downlink data to the stations that transmitted PS-polls in a data delivery period 325. The stations may also acknowledge receipt of the downlink data. As an example, data 330 for STA_1 335 is acknowledged by ACK 332, while data 340 for STA_2 345 is acknowledged by ACK 342 and data 350 for STA_3 355 is acknowledged by ACK 352.

In current WLANs, a TIM based technique is used to provide power savings for stations. In the TIM based technique, a station wakes up at one or multiple beacon intervals to listen to a TIM transmitted in a beacon frame from an AP. The TIM includes a bitmap where each bit represents the presence or absence of a buffered packet(s) for a station associated with the bit. As an example, if a bit associated with a station is equal to a 1, then there is a buffered packet(s) for the station at the AP, while if the bit is equal to a 0, then there are no buffered packet(s) for the station at the AP. If there is a buffered packet(s) for the station, the station should stay awake and transmit a PS-Poll frame to the AP to indicate to the AP that the station is ready to receive the buffered packet(s). The PS-Poll frames transmitted by multiple stations need to follow the EDCA rules and has to be sent in a time division multiple access (TDMA) fashion. Upon receiving the PS-Poll(s), the AP can either send the buffered packet(s) to the station(s) or send an acknowledgement(s) to the station(s) and send the buffered packet(s) at a later time.

The PS-Poll frames from multiple stations may need to follow the EDCA rule and has to be sent in a time division multiple access (TDMA) fashion. Upon receipt of a PS-Poll frame from a station, the AP will transmit buffered packets to the station. Since PS-Poll frame is short, it will generally be beneficial to send PS-Poll frames from multiple stations in an OFDMA manner.

According to an example embodiment, since PS-Poll frames are short, it is beneficial to transmit PS-Poll frames from multiple stations using OFDMA. As discussed previously, OFDMA has been shown to support the efficient use of resource when traffic from one station does not fill up the entirety of the communications system bandwidth. OFDMA allows for unused bandwidth to be used to carry traffic from other stations. As an example, if PS-Polls utilize only ⅕-th of the communications system bandwidth, ⅘-th of the communications system bandwidth would be wasted without OFDMA. OFDMA would allow for the unused communications system bandwidth to be used by up to 4 PS-Polls from other stations.

However, to transmit PS-Poll frames in an OFDMA manner, there is a need to determine the resource allocation (e.g., frequency locations) for the multiple stations on the uplink. In 3GPP LTE, resource allocations for UL transmissions are scheduled by an evolved NodeB (eNB) and scheduling information associated with the resource allocations are sent from the eNB to user equipments (UEs) over a downlink control channel. The eNB needs to know of the UEs' intentions to send data, as well as the sizes of the buffered data before it can schedule the resource allocations. However, for PS-Poll transmissions in Wi-Fi communications systems, the AP has no knowledge about which station is ready to send a PS-Poll. For efficiency reasons, the AP typically cannot perform resource allocations for PS-Polls on the UL for each station having a TIM bit set to "1", since doing so would be potentially extremely inefficient use of network resources. As an example if a TIM bitmap indicates that an AP has buffered data for 16 stations, but only 5 stations respond with PS-Polls to indicate that they are ready to receive the buffered data, therefore blindly allocating network resources for all 16 stations would result in 11 network resources being allocated but unused.

In co-assigned U.S. patent application entitled "System and Method for OFDMA PS-Poll Transmission," application Ser. No. 14/478,756, filed Sep. 5, 2014, which is hereby incorporated herein by reference, a station can determine its resource allocation of network resources for OFDMA PS-Poll transmission in accordance with an identifier of the station, or an order of bit "1" in the TIM for the station being paged. Additionally, timing information may be combined with one or both the identifier of the station or the order of bit "1" in the TIM to determine the resource allocation of network resources for OFDMA PS-Poll transmission. Detailed discussions of the station determining its resource allocation may be found therein.

It is noted that it is possible for an AP to send control information related to OFDMA PS-Poll resource allocation to a station in a trigger frame at a time after a beacon frame. The timing of the trigger frame may be indicated in the beacon frame itself.

According to an example embodiment, it is possible to combine the ability of a station to determine its resource allocation of network resources for OFDMA PS-Poll transmission in accordance with an identifier of the station, or an order of bit "1" in the TIM for the station being paged with or without timing information and the transmission of control information related to OFDMA PS-Poll resource allocations in a trigger frame at a time after a beacon frame. Such a combination may allow for the utilization of existing TIMs in beacon frames and/or additional trigger frames if necessary.

According to an example embodiment, a station wakes up and receives a beacon frame from an AP. The beacon frame includes a TIM element, as well as one or more timing offset information. When the AP needs to transmit multiple trigger frames to indicate the control information of multiple OFDMA PS-Poll transmissions occurring at different times, the AP may transmit more than one or more timing offset information, each corresponding to one trigger frame transmission, respectively. If the timing offset information is set to a first value, it is indicating that the OFDMA PS-Poll transmission will occur immediately (e.g., after a SIFS) after the end of the beacon frame. If the timing offset information is set to a second value, which is different from the first value, it is indicating that one or more trigger frames will be transmitted at TIME+timing offset after the end of the beacon frame, where TIME is the time of the end of the beacon frame. As an example, the second value ranges from 0 and up to represent a difference from an end of the beacon frame and a beginning of the trigger frame. The OFDMA PS-Poll transmission will occur immediately (e.g., after a SIFS) after the end of the trigger frames.

According to an example embodiment, when a beacon frame includes timing offset information that is set to a third value (which is different from the first value and the second value), the beacon frame and the trigger frame may be transmitted at the same time or substantially the same time. In other words, the trigger frame and the beacon frame may be aggregated together.

Furthermore, if the timing offset information is set to the first value, the beacon frame may also carry information indicating the location of a resource pool for all PS-Poll transmissions. Therefore, if the bit corresponding to the station in the TIM bitmap is "1" and if the timing offset information is equal to the first value, the station may be able to derive the location of its UL resource for PS-Poll transmission based on the order of the "1" corresponding to the station in the TIM bitmap and the information regarding the location of the resource pool. The station may transmit its OFDMA PS-Poll (i.e., an OFDMA PS-Poll frame) at the derived location a SIFS after the end of the beacon frame. Since both the station and the AP have common knowledge of the order of the "1" corresponding to the station in the TIM bitmap, they know where to transmit (the station) or receive (the AP) the PS-Poll frame.

As an illustrative example, the resource allocation may be derived as follows:

$$i_{sta} = \text{OneOrder}_{sta} \bmod N,$$

where $i_{sta}$ is the index of a channel within the resource pool for the station to transmit its PS-Poll frame; $\text{OneOrder}_{sta}$ is the order of the "1" corresponding to the station in the TIM bitmap; and N is the number of channels that can be accommodated in the resource pool allocated by the AP.

If the bit corresponding to the station in the TIM bitmap is "1" and if the timing offset information is equal to a second value which is different from the first value, the station receives a trigger frame a timing offset after the end of the beacon frame, the station derives the location of its UL resource for PS-Poll transmission based on the control information indicated in the trigger frame, and the station transmits the OFDMA PS-Poll frame at the derived resource location a SIFS after the end of the trigger frame.

Figure 4A:
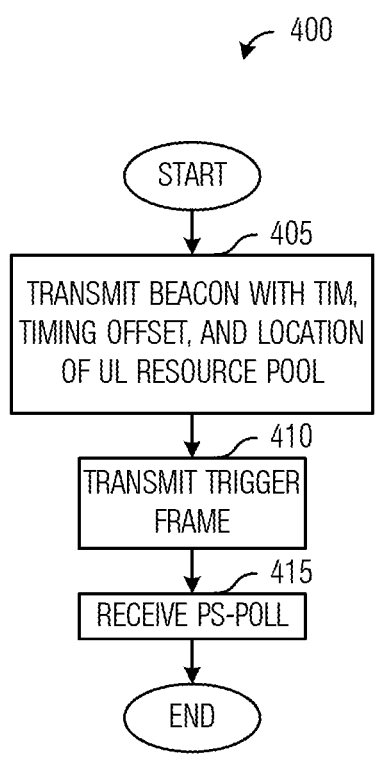
FIG. 4a illustrates a flow diagram of example operations occurring in an AP according to example embodiments described herein.

FIG. 4a illustrates a flow diagram of example operations 400 occurring in an AP. Operations 400 may be indicative of operations occurring in an AP, such as AP 105, as the AP receives an OFDMA PS-Poll frame.

Operations 400 may begin with the AP transmitting a beacon frame (block 405). The beacon frame may include a TIM bitmap, timing offset information set to a value (e.g., the first value, a second value, a third value, and the like), and location information related to an UL resource pool. Depending on the value of the timing offset information, the AP may transmit a trigger frame(s) (block 410). The trigger frame may include control information usable by stations to derive the location of their respective UL resource. The AP may receive an OFDMA PS-Poll frame (block 415). The AP may receive the OFDMA PS-Poll frame at a location derived from information included in the beacon frame. Alternatively, the AP may receive the OFDMA PS-Poll frame at a location derived from information included in the trigger frame(s).

Figure 4B:
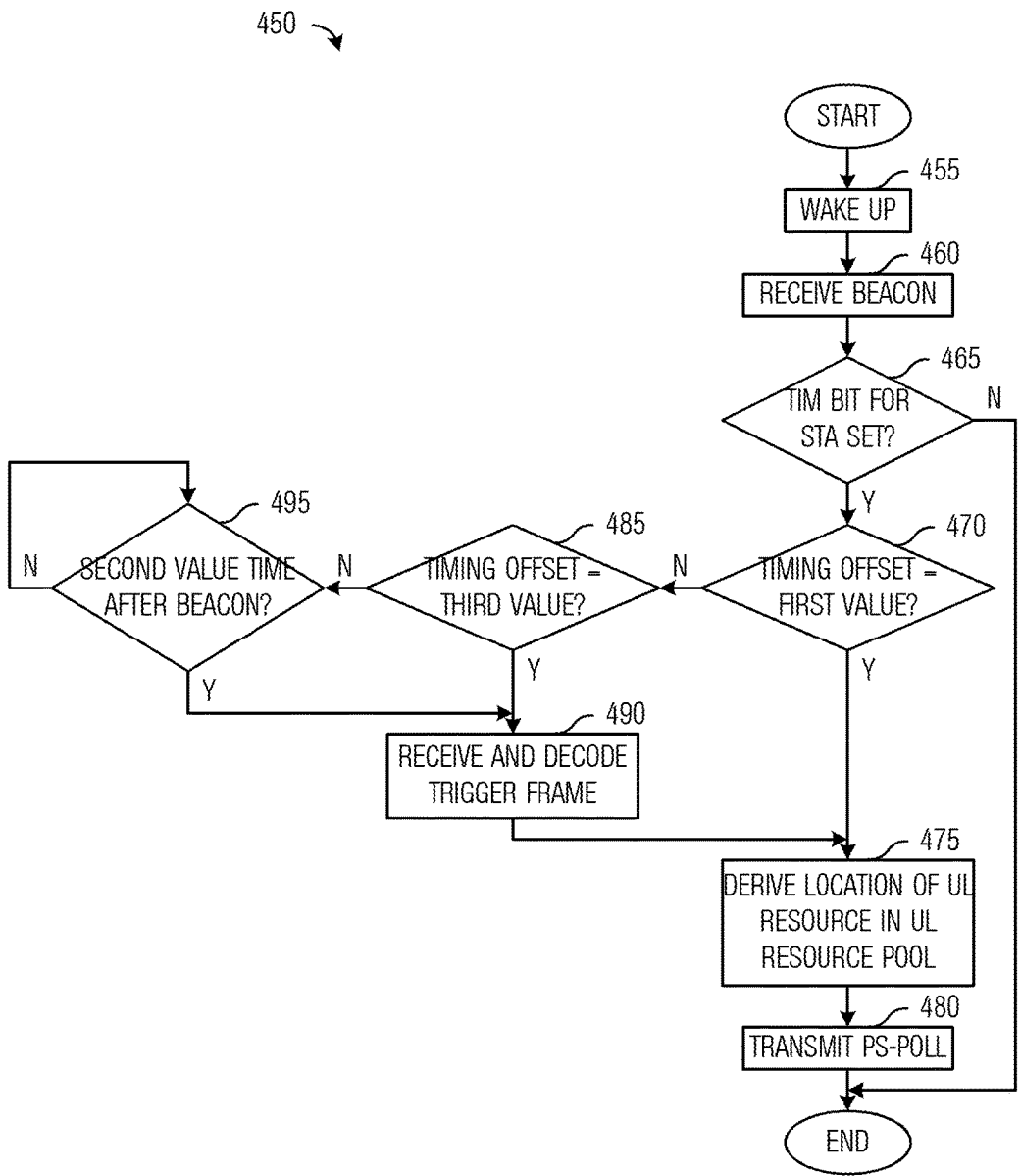
FIG. 4b illustrates a flow diagram of example operations occurring in a station according to example embodiments described herein.

FIG. 4b illustrates a flow diagram of example operations 450 occurring in a station. Operations 450 may be indicative of operations occurring in a station, such as stations 110-118, as the station sends an OFDMA PS-Poll frame.

Operations 450 begin with the station waking up (block 455). As an illustrative example, the station may wake up from a sleep state or a reduced power state. The station receives a beacon frame transmitted by an AP (block 460). The beacon frame may include a TIM bitmap, and timing offset information. The beacon may also include a location of a UL resource pool that may be used to transmit PS-Polls. The station performs a check to determine if the AP has data packet(s) buffered for it (block 465). As discussed previously, the station may check the state of a bit in the TIM bitmap associated with the station to determine if the AP has buffered data packet(s) intended for the station. If the AP does have buffered data packet(s) for the station, the station performs another check to determine if the timing offset information is set to the first value (block 470).

If the timing information is set to the first value (block 470), the station knows that it is to transmit its PS-Poll frame a SIFS after the end of the beacon frame. Additionally, the beacon frame will include information about the location of the UL resource pool that may be used to transmit PS-Polls. The station derives the location of its UL resource for PS-Poll transmission based on the order of the "1" corresponding to the station in the TIM bitmap and the information regarding the location of the resource pool (block 475). The station transmits the PS-Poll frame in the UL resource (block 480).

Alternatively, the beacon frame may also include a timestamp, and the station may derive the location of the UL resource based on the position of its "1" in the TIM bitmap, the location of the UL resource pool, and the timestamp. A detailed discussion of such a derivation is provided in co-assigned U.S. patent application entitled "System and Method for OFDMA PS-Poll Transmission," application Ser. No. 14/478,756, filed Sep. 5, 2014.

Alternatively, abbreviated identifying information is used, along with timing information, to derive the location of the UL resource. A detailed discussion of such a derivation is also provided in co-assigned U.S. patent application entitled "System and Method for OFDMA PS-Poll Transmission," application Ser. No. 14/478,756, filed Sep. 5, 2014.

If the timing information is not set to the first value (block 470), the station knows that it is to transmit its PS-Poll frame a SIFS after the end of a trigger frame, which will begin a second value after the end of the beacon frame or at substantially the same time as the beacon frame. The station performs a check to determine if the timing offset information is set to a third value (block 485). If the timing offset information is set to the third value, the station knows that the trigger frame started at substantially the same time as the beacon frame. As an illustrative example, the beacon frame and the trigger frame may be aggregated together. The beacon frame and the trigger frame may be packed into two different MAC frames, respectively, but the two MAC frames are sent in the same physical (PHY) frame, such as one MAC frame followed by the other but they are part of the same PHY frame in a manner similar to an aggregated MAC protocol data unit (A-MPDU) in current IEEE 802.11 technical standards. As another illustrative example, the beacon frame and the trigger frame are sent in two different PHY frames in an OFDMA fashion, each on a different frequency resource. The station receives and decodes the trigger frame (block 490). The trigger frame may or may not include control information to help the station determine the location of its UL resource for PS-Poll transmission. The station may derive the location of its UL resource for PS-Poll transmission based on the order of the "1" corresponding to the station in the TIM bitmap and the information regarding the location of the resource pool (block 475). The station may make use of control information included in the trigger frame in the derivation of the location of its UL resource for PS-Poll transmission. The station may transmit the PS-Poll frame in the UL resource (block 480).

If the timing offset information is not set to the third value (block 485), then the station waits a second value of time after the end of the beacon frame (block 495). The station receives and decodes the trigger frame (block 490). The trigger frame may or may not include control information to help the station determine the location of its UL resource for PS-Poll transmission. The station may derive the location of its UL resource for PS-Poll transmission based on the order of the "1" corresponding to the station in the TIM bitmap and the information regarding the location of the resource pool (block 475). The station may make use of control information included in the trigger frame in the derivation of the location of its UL resource for PS-Poll transmission. The station may transmit the PS-Poll frame in the UL resource (block 480).

Figure 5:
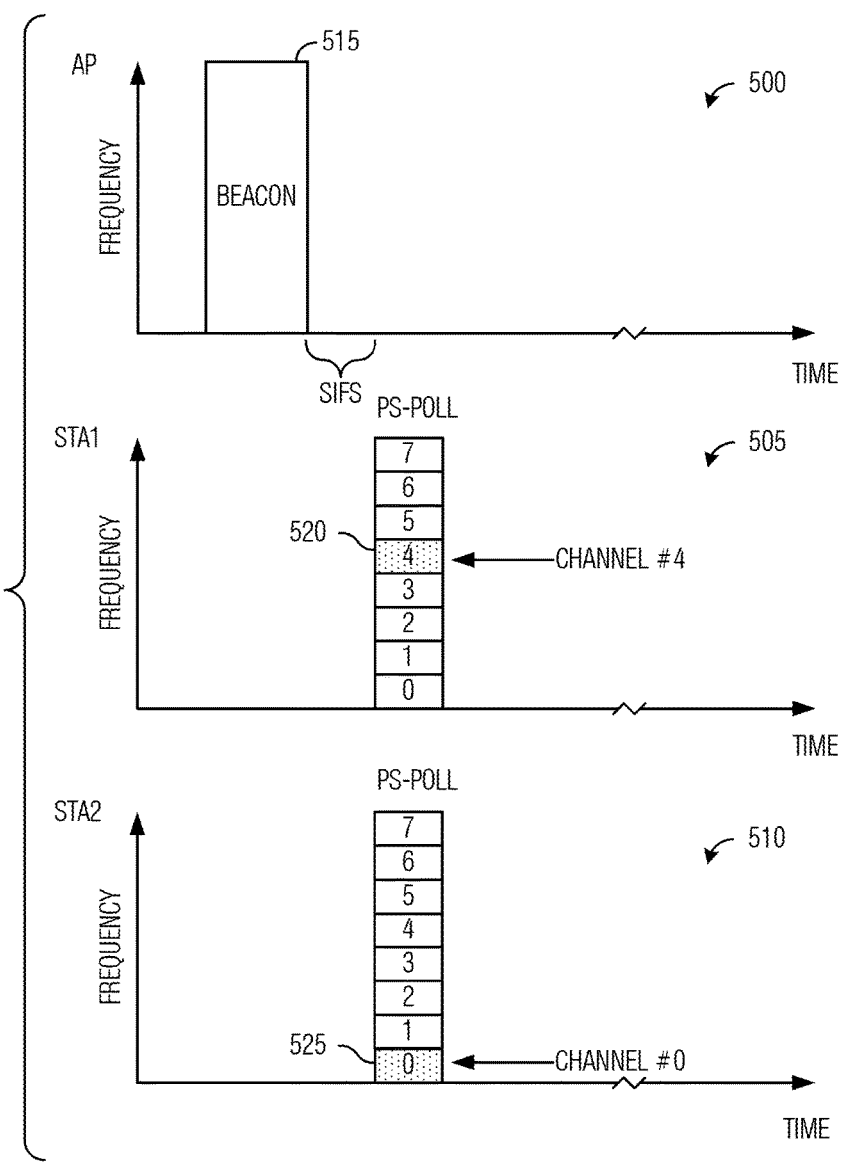
FIG. 5 illustrates example time-frequency diagrams for an AP and two stations participating in PS-Poll transmission using OFDMA wherein a timing offset is set to the first value according to example embodiments described herein.

FIG. 5 illustrates example time-frequency diagrams for an AP and two stations participating in PS-Poll transmission using OFDMA wherein a timing offset is set to the first value. A first time-frequency diagram 500 displays transmissions made by the AP, a second time-frequency diagram 505 displays transmissions made by a first station (STA1), and a third time-frequency diagram 510 displays transmissions made by a second station (STA2). The AP transmits a beacon 515. For discussion purposes, consider a situation wherein beacon 515 includes timing offset information set to the first value, meaning that stations can begin transmitting PS-Poll frames a SIFS after the end of beacon 515. As shown in FIG. 5, one SIFS after the end of beacon 515, STA1 transmits its PS-Poll frame in network resource #4 (shown as block 520) and STA2 transmits its PS-Poll frame in network resource #0 (shown as block 525).

Figure 6:
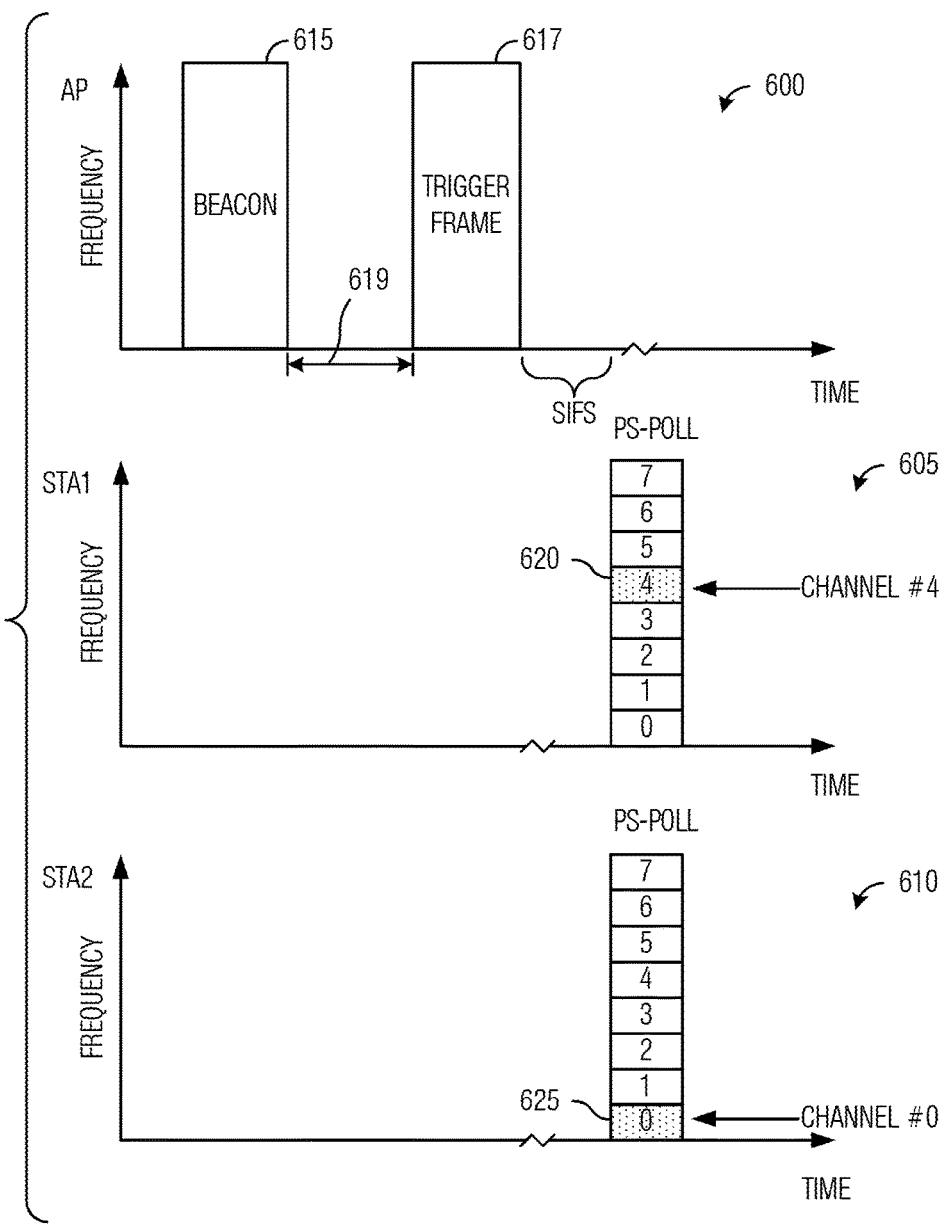
FIG. 6 illustrates example time-frequency diagrams for an AP and two stations participating in PS-Poll transmission using OFDMA wherein a timing offset is set to a second value according to example embodiments described herein.

FIG. 6 illustrates example time-frequency diagrams for an AP and two stations participating in PS-Poll transmission using OFDMA wherein a timing offset is set to a second value. A first time-frequency diagram 600 displays transmissions made by the AP, a second time-frequency diagram 605 displays transmissions made by a first station (STA1), and a third time-frequency diagram 610 displays transmissions made by a second station (STA2). The AP transmits a beacon 615. For discussion purposes, consider a situation wherein beacon 615 includes timing offset information set to a second value, meaning that stations can begin transmitting PS-Poll frames a SIFS after the end of a trigger frame that is transmitted the second value of time after the end of beacon 615. As shown in FIG. 6, interval 619 may represent a time duration equal to the second value, after which, the AP transmits a trigger frame 617. A SIFS after trigger frame 617 completes, STA1 transmits its PS-Poll frame in network resource #4 (shown as block 620) and STA2 transmits its PS-Poll frame in network resource #0 (shown as block 625).

Figure 7:
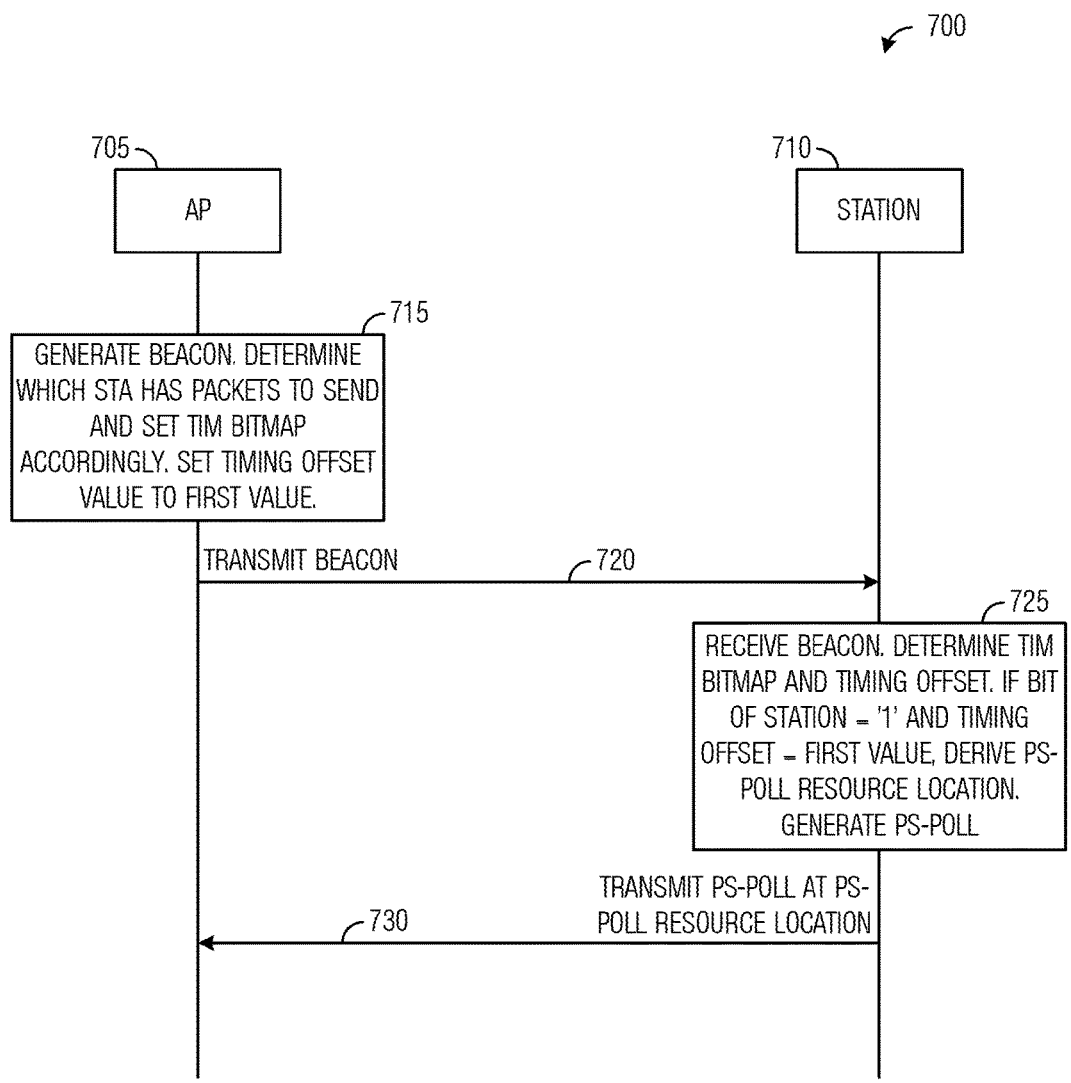
FIG. 7 illustrates a message exchange diagram highlighting an example message exchange and operations between an AP and a station, where a beacon frame transmitted by the AP includes timing offset information set to the first value according to example embodiments described herein.

FIG. 7 illustrates a message exchange diagram 700 highlighting an example message exchange and operations between an AP 705 and a station 710, where a beacon frame transmitted by AP 705 includes timing offset information set to the first value. AP 705 generates a beacon frame that includes a TIM bitmap and timing offset information set to the first value (block 715). AP 705 transmits the beacon frame (shown as event 720). Station 710 receives the beacon frame and processes it (block 725). If a bit in the TIM bitmap associated with station 710 is set to "1" and if the timing offset information is equal to the first value, station 710 may derive its UL PS-Poll resource allocation in accordance with the beacon frame. Station 710 transmits its PS-Poll frame at the UL PS-Poll resource allocation (shown as event 730).

Figure 8:
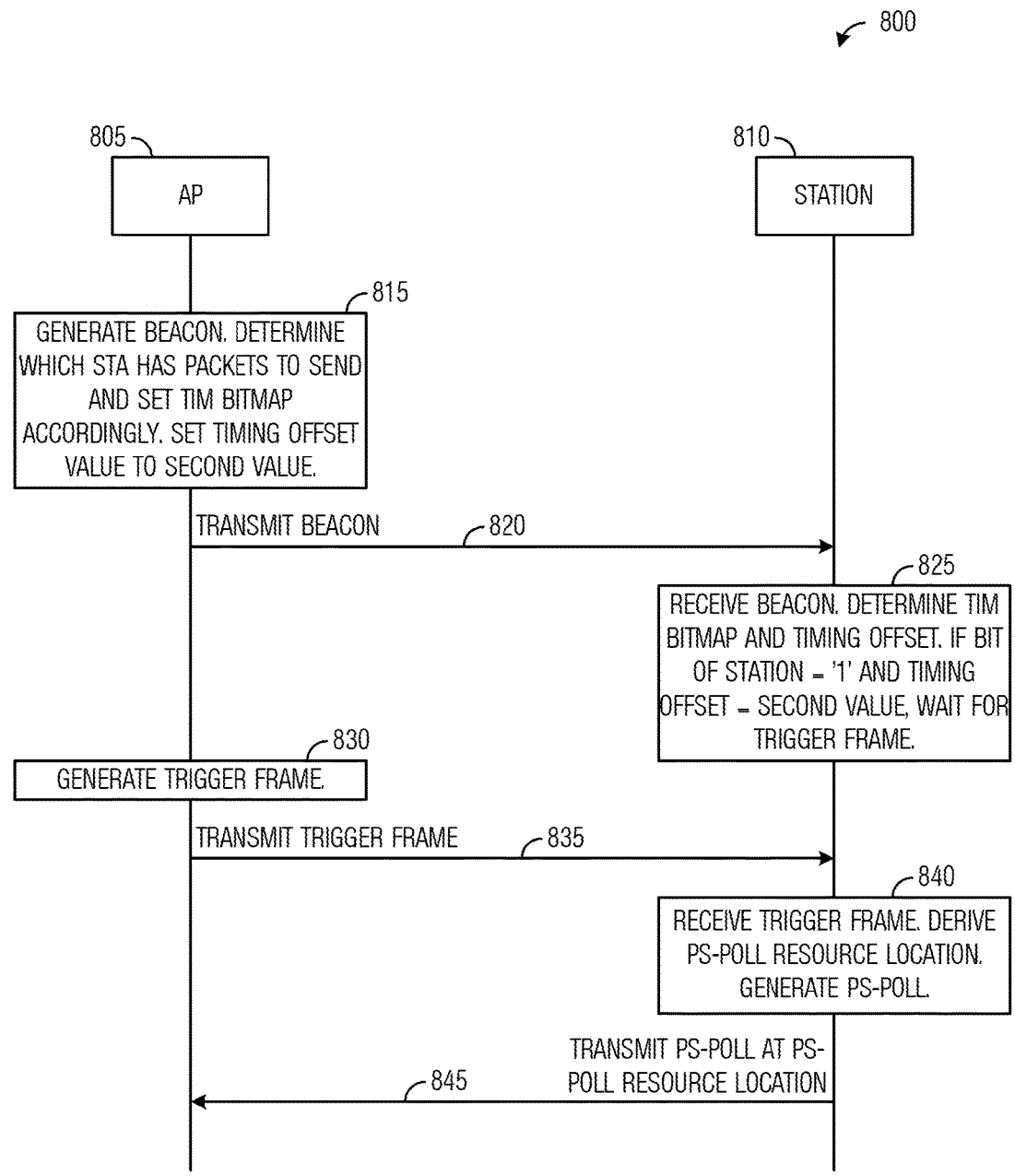
FIG. 8 illustrates a message exchange diagram highlighting an example message exchange and operations between an AP and a station, where a beacon frame transmitted by the AP includes timing offset information set to a second value that is not equal to the first value according to example embodiments described herein.

FIG. 8 illustrates a message exchange diagram 800 highlighting an example message exchange and operations between an AP 805 and a station 810, where a beacon frame transmitted by AP 805 includes timing offset information set to a second value that is not equal to the first value. AP 805 generates a beacon frame that includes a TIM bitmap and timing offset information set to the second value (block 815). AP 805 transmits the beacon frame (shown as event 820). Station 810 receives the beacon frame and processes it (block 825). If a bit in the TIM bitmap associated with station 810 is set to "1" and if the timing offset information is equal to the second value, station 810 may need to wait until it receives a trigger frame before it can transmit its PS-Poll frame. Station 810 may enter a reduced power state or a sleep mode while waiting for the trigger frame, which is transmitted the second value of time after the end of the beacon frame. AP 805 may generate the trigger frame (block 830) and transmit the trigger frame the second value of time after the end of the beacon frame (block 835). Station 810 may receive the trigger frame and derive its UL PS-Poll resource allocation in accordance with the trigger frame (block 840). Station 810 transmits its PS-Poll frame at the UL PS-Poll resource allocation (shown as event 845).

Figure 9:
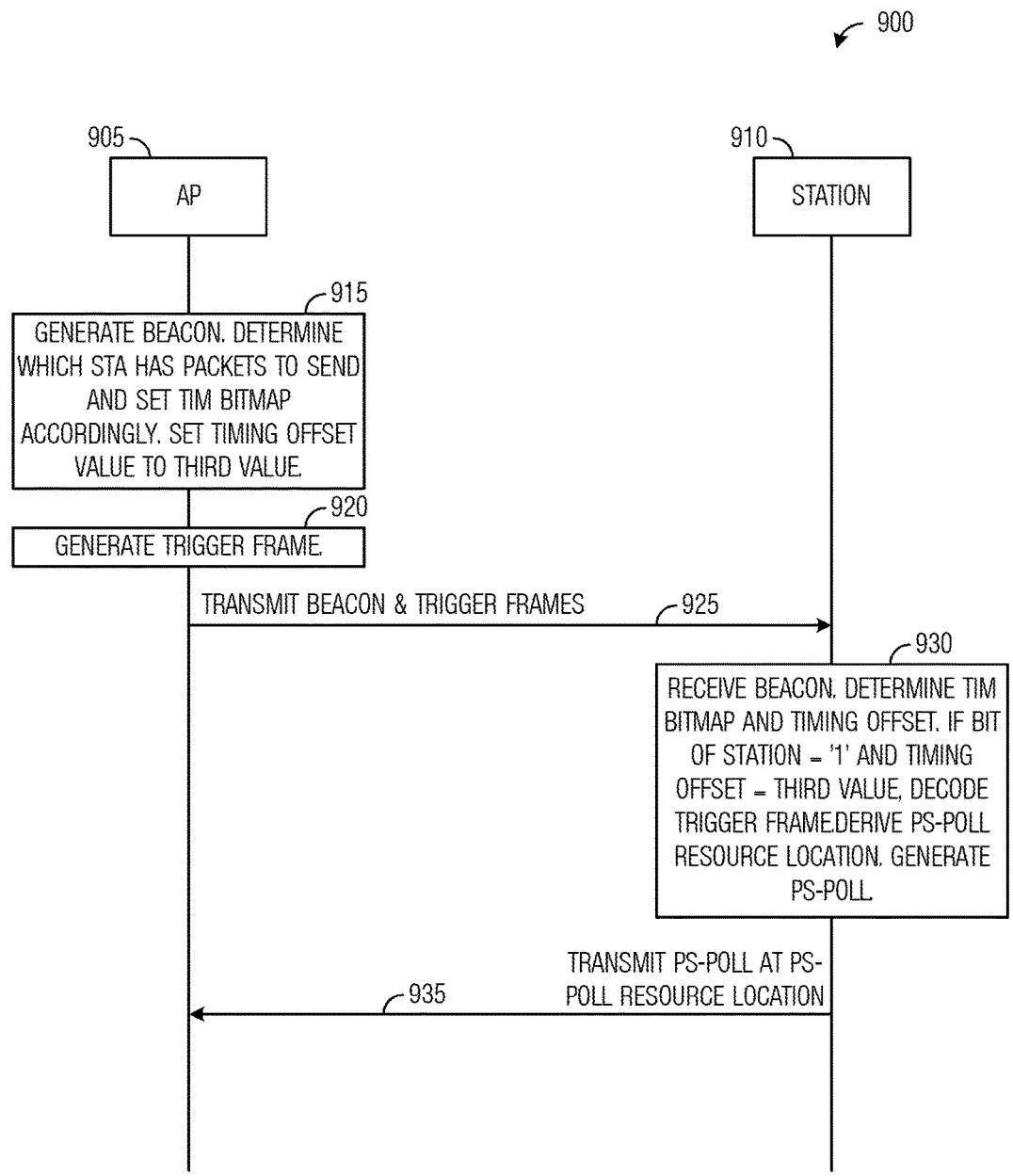
FIG. 9 illustrates a message exchange diagram highlighting an example message exchange and operations between an AP and a station, where a beacon frame transmitted by the AP includes timing offset information set to a third value that is not equal to the first value or the second value according to example embodiments described herein.

FIG. 9 illustrates a message exchange diagram 900 highlighting an example message exchange and operations between an AP 905 and a station 910, where a beacon frame transmitted by AP 905 includes timing offset information set to a third value that is not equal to the first value or the second value. AP 905 generates a beacon frame that includes a TIM bitmap and timing offset information set to the third value (block 915). AP 910 generates the trigger frame (block 920). AP 905 transmits the beacon frame and the trigger frame (shown as event 925). The beacon frame and the trigger frame may be sent at substantially the same time. Station 910 receives the beacon frame and processes it (block 930). If a bit in the TIM bitmap associated with station 910 is set to "1" and if the timing offset information is equal to the third value, station 910 may need to decode the trigger frame that was transmitted at substantially the same time as the beacon frame. Station 910 may decode the trigger frame and derive its UL PS-Poll resource allocation in accordance with the trigger frame. Station transmits its PS-Poll frame at the UL PS-Poll resource allocation (shown as event 935).

According to an example embodiment, when a trigger frame is used (for example, when the timing offset information is set to a second value that is different from the first value, or in another example, when a trigger frame is sent together with the beacon frame in an aggregated frame with no time gap between the trigger frame and the beacon frame (when the timing offset information is set to a third value that is different from both the first value and the second value)), it is desired to reduce signaling overhead associated with the trigger frame. Information carried in the TIM (carried in a beacon frame) is used to reduce the size of the control information included in the trigger frame. In such a situation, the trigger frame may comprise an indicator of station identifier (such as STA ID). If the station identifier is equal to a first identifier value (e.g., an all "0" or an all "1" bit stream), it indicates that the control information in the trigger frame is for the stations being paged in the TIM of the previous beacon frame. Using such an indicator may enable the avoidance of having to list the identifiers of stations that have been paged in the TIM, thereby reducing overhead.

Furthermore, if the trigger frame comprises control information for only a portion of the stations that have been paged in the TIM, the trigger frame may additionally carry an indicator that indicates the targeted stations. As an illustrative example, the indicator may be in the form of, for example:

Form 1—a bitmap out of the "1" bits in the TIM;

Form 2—a starting point and an ending point of the "1" s in the TIM; or

Form 3—a starting point of the "1" s in the TIM and a number of "1" s targeted.

For discussion purposes, consider a situation where there are 8 stations that have been paged in a TIM in a beacon frame. Therefore, there are 8 "1" s set in the TIM bitmap, with the 8 "1" s corresponding to stations 1 through 8, respectively. For Form 1, the control information may use a bitmap of "11110000" to indicate that the control information regarding OFDMA PS-Poll frames included therein are for stations 1 to 4. For Form 2, the control information in the trigger frame may indicate the starting point of the "1" bits in the TIM, e.g., "000" (corresponding to the first "1" bit) and the ending point of the "1" bits in the TIM, e.g., "011" (corresponding to the fourth "1" bit), therefore the control information indicates that the control information regarding OFDMA PS-Poll frames included therein are for stations 1 to 4. For Form 3, the control information in the trigger frame may indicate the starting point of the "1" bits in the TIM, e.g., "000" (corresponding to the first "1" bit) and the number of "1" s targeted, e.g., 4 or "100", therefore the control information indicates that the control information regarding OFDMA PS-Poll frames included therein are for stations 1 to 4.

According to an example embodiment, beacon frames include timestamp information. Stations receiving beacon frames that include timestamp information can also utilize the timestamp information to derive their UL resource allocations for PS-Poll transmission. The inclusion of the timestamp information may allow for the UL resource allocation to change over time and therefore help to randomize interference that the station observes or generates as a function of time. This can help improve the robustness of the communications system. An example of deriving the UL resource allocation may be as follows:

$$i_{sta} = (\text{OneOrder}_{sta} + \text{TimeStamp}) \bmod N,$$

where $i_{sta}$ is the index of a channel within the resource pool for the station to transmit its PS-Poll frame; $\text{OneOrder}_{sta}$ is the order of the "1" corresponding to the station in the TIM bitmap; TimeStamp is the timestamp information included in the beacon frame; and N is the number of channels that can be accommodated in the resource pool allocated by the AP.

Figure 10:
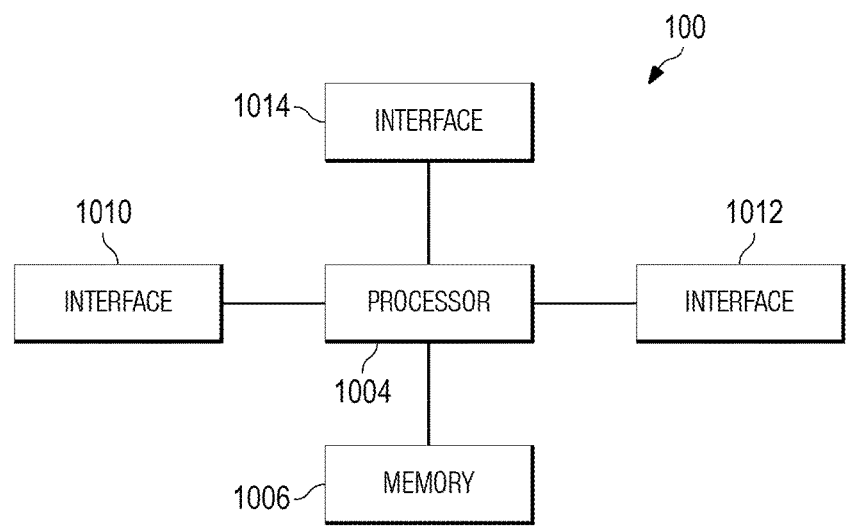
FIG. 10 illustrates a block diagram of an embodiment processing system for performing methods described herein.

FIG. 10 illustrates a block diagram of an embodiment processing system 1000 for performing methods described herein, which may be installed in a host device. As shown, the processing system 1000 includes a processor 1004, a memory 1006, and interfaces 1010-1014, which may (or may not) be arranged as shown in FIG. 10. The processor 1004 may be any component or collection of components adapted to perform computations and/or other processing related tasks, and the memory 1006 may be any component or collection of components adapted to store programming and/or instructions for execution by the processor 1004. In an embodiment, the memory 1006 includes a non-transitory computer readable medium. The interfaces 1010, 1012, 1014 may be any component or collection of components that allow the processing system 1000 to communicate with other devices/components and/or a user. For example, one or more of the interfaces 1010, 1012, 1014 may be adapted to communicate data, control, or management messages from the processor 1004 to applications installed on the host device and/or a remote device. As another example, one or more of the interfaces 1010, 1012, 1014 may be adapted to allow a user or user device (e.g., personal computer (PC), etc.) to interact/communicate with the processing system 1000. The processing system 1000 may include additional components not depicted in FIG. 10, such as long term storage (e.g., non-volatile memory, etc.).

In some embodiments, the processing system 1000 is included in a network device that is accessing, or part otherwise of, a telecommunications network. In one example, the processing system 1000 is in a network-side device in a wireless or wireline telecommunications network, such as a base station, a relay station, a scheduler, a controller, a gateway, a router, an applications server, or any other device in the telecommunications network. In other embodiments, the processing system 1000 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 11:
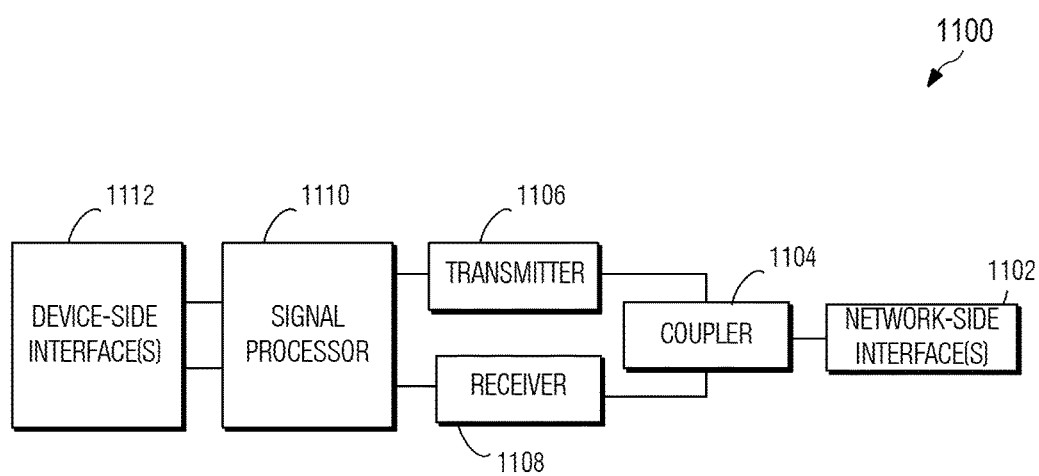
FIG. 11 illustrates a block diagram of a transceiver adapted to transmit and receive signaling over a telecommunications network according to example embodiments described herein.

In some embodiments, one or more of the interfaces 1010, 1012, 1014 connects the processing system 1000 to a transceiver adapted to transmit and receive signaling over the telecommunications network. FIG. 11 illustrates a block diagram of a transceiver 1100 adapted to transmit and receive signaling over a telecommunications network. The transceiver 1100 may be installed in a host device. As shown, the transceiver 1100 comprises a network-side interface 1102, a coupler 1104, a transmitter 1106, a receiver 1108, a signal processor 1110, and a device-side interface 1112. The network-side interface 1102 may include any component or collection of components adapted to transmit or receive signaling over a wireless or wireline telecommunications network. The coupler 1104 may include any component or collection of components adapted to facilitate bi-directional communication over the network-side interface 1102. The transmitter 1106 may include any component or collection of components (e.g., up-converter, power amplifier, etc.) adapted to convert a baseband signal into a modulated carrier signal suitable for transmission over the network-side interface 1102. The receiver 1108 may include any component or collection of components (e.g., down-converter, low noise amplifier, etc.) adapted to convert a carrier signal received over the network-side interface 1102 into a baseband signal. The signal processor 1110 may include any component or collection of components adapted to convert a baseband signal into a data signal suitable for communication over the device-side interface(s) 1112, or vice-versa. The device-side interface(s) 1112 may include any component or collection of components adapted to communicate data-signals between the signal processor 1110 and components within the host device (e.g., the processing system 6001000, local area network (LAN) ports, etc.).

The transceiver 1100 may transmit and receive signaling over any type of communications medium. In some embodiments, the transceiver 1100 transmits and receives signaling over a wireless medium. For example, the transceiver 1100 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1102 comprises one or more antenna/radiating elements. For example, the network-side interface 1102 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1100 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

FIG. 12 is a block diagram of a processing system 1200 that may be used for implementing the devices and methods disclosed herein. In some embodiments, the processing system 1200 comprises a UE. In other embodiments, the processing system 1200 comprises a network controller. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 805 equipped with one or more input/output devices, such as a human interface 1215 (including speaker, microphone, mouse, touchscreen, keypad, keyboard, printer, and the like), display 1210, and so on. The processing unit may include a central processing unit (CPU) 1220, memory 1225, a mass storage device 1230, a video adapter 1235, and an I/O interface 1240 connected to a bus 1245.

The bus 1245 may be one or more of any type of several bus architectures including a memory bus or memory controller, a peripheral bus, video bus, or the like. The CPU 1220 may comprise any type of electronic data processor. The memory 1225 may comprise any type of system memory such as static random access memory (SRAM), dynamic random access memory (DRAM), synchronous DRAM (SDRAM), read-only memory (ROM), a combination thereof, or the like. In an embodiment, the memory 1225 may include ROM for use at boot-up, and DRAM for program and data storage for use while executing programs.

The mass storage device 1230 may comprise any type of storage device configured to store data, programs, and other information and to make the data, programs, and other information accessible via the bus 1245. The mass storage device 1230 may comprise, for example, one or more of a solid state drive, hard disk drive, a magnetic disk drive, an optical disk drive, or the like.

The video adapter 1235 and the I/O interface 1240 provide interfaces to couple external input and output devices to the processing unit 1205. As illustrated, examples of input and output devices include the display 1210 coupled to the video adapter 1235 and the mouse/keyboard/printer 1215 coupled to the I/O interface 1240. Other devices may be coupled to the processing unit 1205, and additional or fewer interface devices may be utilized. For example, a serial interface such as Universal Serial Bus (USB) (not shown) may be used to provide an interface for a printer.

The processing unit 1205 also includes one or more network interfaces 1250, which may comprise wired links, such as an Ethernet cable or the like, and/or wireless links to access nodes or different networks 1255. The network interface 1250 allows the processing unit 1205 to communicate with remote units via the networks 1255. For example, the network interface 1250 may provide wireless communication via one or more transmitters/transmit antennas and one or more receivers/receive antennas. In an embodiment, the processing unit 1205 is coupled to a local-area network or a wide-area network 1255 for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for communicating in a wireless communications system, the method comprising:
receiving, by a station, a first frame including a paging bitmap and a timing offset indicator; and
in response to the station being permitted to transmit an orthogonal frequency division multiple access (OFDMA) power-saving poll (PS-Poll) packet according to the paging bitmap, transmitting, by the station, the OFDMA PS-Poll packet at a location of a network resource in accordance with a station identifier and the timing offset indicator,
the station identifier being a location of a bit corresponding to the station in a plurality of candidate stations according to the paging bitmap, and
the location of the network resource in accordance with the station identifier being expressible as location=OneOrder$_{station}$ modulo N, where location is the location of the network resource, OneOrder$_{station}$ is a derived station identifier derived from a location of a bit corresponding to the station according to the paging bitmap, and N is a number of network resources in a resource pool.

2. The method of claim 1, further comprising determining the location of the network resource, the determining comprising:
determining, by the station, whether the station is intended to receive a second frame before transmitting the OFDMA PS-Poll packet according to the timing offset indicator; and
in response to the station being intended to receive the second frame, receiving, by the station, the second frame including control information, and determining, by the station, the location of the network resource in accordance with the control information in the second frame and the station identifier.

3. The method of claim 1, wherein transmitting the OFDMA PS-Poll packet in accordance with the timing offset indicator comprises transmitting the OFDMA PS-Poll packet in accordance with a value of the timing offset indicator, wherein:
a first value of the timing offset indicator instructs the station not to receive a second frame before transmitting the OFDMA PS-Poll packet;
a second value of the timing offset indicator instructs the station to receive the second frame before transmitting the OFDMA PS-Poll packet; and
a third value of the timing offset indicator instructs the station to receive the second frame at substantially a same time as the first frame.

4. The method of claim 2, wherein the control information in the second frame includes a station identification indicator instructing the station that the control information is intended for a plurality of candidate stations according to the paging bitmap.

5. The method of claim 2, wherein the control information in the second frame comprises a bitmap instructing the station that the control information is intended for a subset of a plurality of candidate stations according to the paging bitmap.

6. The method of claim 2, wherein the control information in the second frame comprises a starting point and an ending point of "1" bits in the paging bitmap instructing the station that the control information is intended for a subset of a plurality of candidate stations according to the paging bitmap.

7. The method of claim 2, wherein the control information in the second frame comprises a starting point of "1" bits in the paging bitmap and a number of consecutive "1"s instructing the station that the control information is intended for a subset of a plurality of candidate stations according to the paging bitmap.

8. The method of claim 1, further comprising determining the location of the network resource, the determining comprising:
determining, by the station, from the first frame, a location of a resource pool of candidate network resources; and
determining, by the station, the location of the network resource in accordance with the location of the resource pool and the station identifier.

9. The method of claim 8, wherein the first frame further comprises a timestamp, and wherein the method further comprises determining the location of the network resource in accordance with the timestamp.

10. The method of claim 1, wherein the first frame is a beacon frame.

11. The method of claim 1, wherein the paging bitmap is a traffic indication map (TIM) bitmap.

12. The method of claim 1, wherein the first frame also comprises a timestamp, and wherein the location of the network resource in the resource pool in accordance with the station identifier is expressible as location =(OneOrder$_{station}$+TimeStamp) modulo N, where TimeStamp is the timestamp indicated in the first frame.

13. A method for communicating in a wireless communications system, the method comprising:
setting, by an access point (AP), a timing offset indicator to a first value, a second value, or a third value,
the first value instructing a plurality of candidate transmitting stations not to receive a second frame before transmitting at least one orthogonal frequency division multiple access (OFDMA) power-saving poll (PS-Poll) packet,
the second value instructing the stations to receive the second frame before transmitting the at least one OFDMA PS-Poll packet, and
the third value instructing the stations to receive the second frame at substantially a same time as a first frame;
transmitting, by the AP, the first frame including a paging bitmap and the timing offset indicator;
determining, by the AP, the plurality of candidate transmitting stations in accordance with the paging bitmap;
determining, by the AP, a plurality of network resource locations in accordance with identifiers of stations in the plurality of candidate transmitting stations; and
receiving, by the AP, at least one OFDMA PS-Poll packet in the plurality of network resource locations, in accordance with the paging bitmap and the timing offset indicator.

14. The method of claim 13, wherein the first frame comprises a beacon frame.

15. The method of claim 13, wherein the paging bitmap comprises a traffic indication map (TIM) bitmap.

16. The method of claim 13, further comprising determining whether the AP is to transmit a second frame prior to receiving the at least one OFDMA PS-Poll packet in accordance with the timing offset indicator.

17. The method of claim 13, wherein the first frame also comprises timestamp information, and wherein the plurality of network resource locations is determined in accordance with the timestamp information.

18. The method of claim 13, wherein the first frame is a beacon frame.

19. The method of claim 13, wherein the paging bitmap is a traffic indication map (TIM) bitmap.

20. A station comprising:
a non-transitory memory storage comprising instructions; and
one or more processors in communication with the non-transitory memory storage, wherein the one or more processors execute the instructions to:
receive a first frame including a paging bitmap and a timing offset indicator, and
in response to the station being permitted to transmit an orthogonal frequency division multiple access (OFDMA) power-saving poll (PS-Poll) packet according to the paging bitmap, transmit, by the station, the OFDMA PS-Poll packet at a location of a network resource in accordance with a station identifier and the timing offset indicator having a first value, a second value, or a third value,
the first value of the timing offset indicator instructing the station is not to receive a second frame before transmitting the OFDMA PS-Poll packet,
the second value of the timing offset indicator instructing the station is to receive the second frame before transmitting the OFDMA PS-Poll packet, and
the third value of the timing offset indicator instructing the station is to receive the second frame at substantially a same time as the first frame.

21. The station of claim 20, wherein the one or more processors execute the instructions to:
determine whether the station is intended to receive a second frame before transmitting the OFDMA PS-Poll packet according to the timing offset indicator, and
in response to the station being intended to receive the second frame, receive the second frame including control information, and determine the location of the network resource in accordance with the control information in the second frame and the station identifier.

22. The station of claim 20, wherein the one or more processors execute the instructions to:
determine, from the first frame, a location of a resource pool of candidate network resources, and
determine the location of the network resource in accordance with the location of the resource pool and the station identifier.

23. The station of claim 20, wherein the first frame further comprises a timestamp, and wherein the one or more processors execute the instructions to determine the location of the network resource in accordance with the timestamp.

24. The station of claim 20, wherein the station identifier is a location of a bit corresponding to the station in a plurality of candidate stations according to the paging bitmap, wherein the location of the network resource in a resource pool in accordance with the station identifier is expressible as $$location = OneOrder_{station} \bmod N,$$

where location is the location of the network resource, $OneOrder_{station}$ is a derived station identifier derived from a location of a bit corresponding to the station according to the paging bitmap, and N is a number of network resources in the resource pool.

25. The station of claim 24, wherein the first frame also comprises a timestamp, and wherein the location of the network resource in the resource pool in accordance with the station identifier is expressible as $$location = (OneOrder_{station} + TimeStamp) \bmod N,$$

where TimeStamp is the timestamp indicated in the first frame.

* * * * *